(12) United States Patent
Schmidt et al.

(10) Patent No.: US 12,509,300 B2
(45) Date of Patent: Dec. 30, 2025

(54) METHOD FOR OPERATING A TECHNICAL PLANT AND TECHNICAL PLANT

(71) Applicant: SEW-EURODRIVE GMBH & CO. KG, Bruchsal (DE)

(72) Inventors: Josef Schmidt, Philippsburg-Huttenheim (DE); Frank Schönung, Graben-Neudorf (DE); Patrick Weis, Wössingen (DE); Michael Angst, Karlsruhe (DE); Alexander Fuchs, Bruchsal (DE); Tanja Walz, Walzbachtal (DE)

(73) Assignee: SEW-EURODRIVE GMBH & CO. KG, Bruchsal (DE)

( * ) Notice: Subject to any disclaimer, the term of this patent is extended or adjusted under 35 U.S.C. 154(b) by 574 days.

(21) Appl. No.: 17/926,226

(22) PCT Filed: Apr. 20, 2021

(86) PCT No.: PCT/EP2021/060261
§ 371 (c)(1),
(2) Date: Nov. 18, 2022

(87) PCT Pub. No.: WO2021/233625
PCT Pub. Date: Nov. 25, 2021

(65) Prior Publication Data
US 2023/0192406 A1 Jun. 22, 2023

(30) Foreign Application Priority Data
May 20, 2020 (DE) .................. 102020003046.7

(51) Int. Cl.
*B66F 9/06* (2006.01)
*B65G 1/137* (2006.01)

(52) U.S. Cl.
CPC ............ *B65G 1/1378* (2013.01); *B66F 9/063* (2013.01)

(58) Field of Classification Search
CPC ........ B65G 1/1378; B66F 9/063; Y02P 90/02; G05B 19/4189
See application file for complete search history.

(56) References Cited

U.S. PATENT DOCUMENTS 5,896,297 A * 4/1999 Valerino, Sr. .... G05B 19/41895
700/218
6,516,234 B2 2/2003 Kamiguchi et al.
(Continued)

FOREIGN PATENT DOCUMENTS

CN 108363373 A 8/2018
DE 69733131 T2 10/2005
(Continued)

OTHER PUBLICATIONS

International Report on Patentability issued in corresponding International Application No. PCT/EP2021/060261 dated Nov. 17, 2022, pp. 1-6, English Translation.
(Continued)

*Primary Examiner* — Justin Holmes
(74) *Attorney, Agent, or Firm* — Carter, DeLuca & Farrell LLP

(57) ABSTRACT

In a method for operating a technical plant, which includes a work area for producing ready-to-ship products from delivered goods and a plurality of load carriers, each including a control, a drive connected to the control, and a communication interface, for transporting goods and for transporting products, goods are delivered to the technical plant, delivered goods are transported into the work area by the load carriers, products are produced in the work area from the goods transported into the work area, produced products are transported out of the work area by the load
(Continued)

carriers, and products transported out of the work area are shipped out from the technical plant. A technical plant, which includes a work area for producing ready-to-ship products made from delivered goods, is operable using the method.

22 Claims, 1 Drawing Sheet

(56) References Cited

U.S. PATENT DOCUMENTS

| | | |
|---|---|---|
| 2009/0159396 A1 | 6/2009 | Wood |
| 2020/0122927 A1 | 4/2020 | Bellar et al. |

FOREIGN PATENT DOCUMENTS

| | | | | |
|---|---|---|---|---|
| DE | 102017002963 A1 | 10/2017 | | |
| DE | 102018204073 A1 | 9/2019 | | |
| EP | 2636618 A1 * | 9/2013 | ............. | B66F 9/063 |
| EP | 3521216 A1 | 8/2019 | | |
| KR | 20190063841 A | 6/2019 | | |
| WO | WO-2007134832 A2 * | 11/2007 | ........... | B65G 1/1378 |
| WO | 2014111242 A2 | 7/2014 | | |
| WO | WO-2015097736 A1 * | 7/2015 | .............. | B65G 1/10 |
| WO | 2017182134 A1 | 10/2017 | | |

OTHER PUBLICATIONS

International Search Report issued in corresponding International Application No. PCT/EP2021/060261 dated Jul. 23, 2021, pp. 1-3, English Translation.

\* cited by examiner

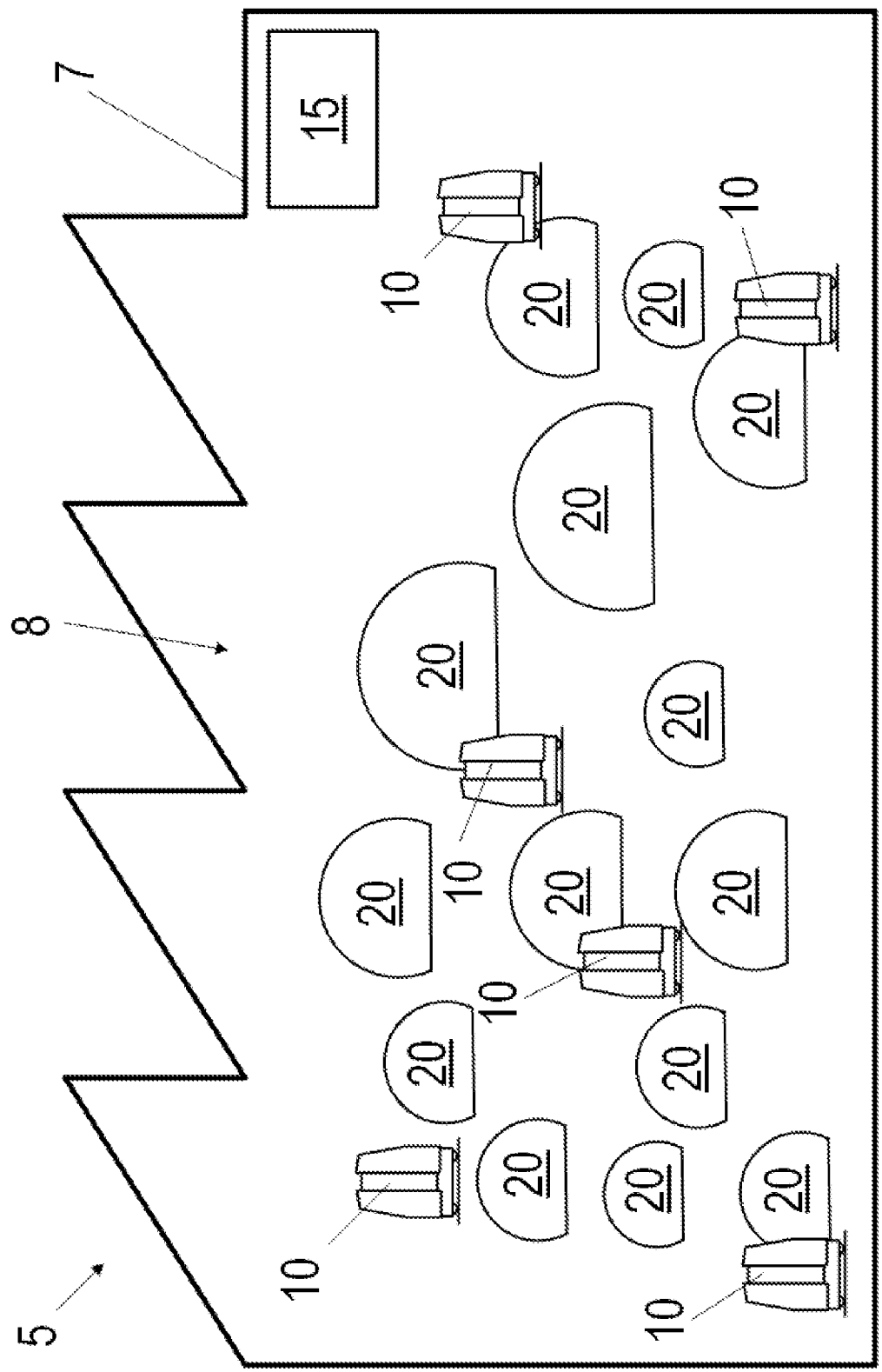

METHOD FOR OPERATING A TECHNICAL PLANT AND TECHNICAL PLANT

FIELD OF THE INVENTION

The present invention relates to a method for operating a technical plant, which includes, for example, a work area for producing ready-to-ship products from delivered goods. The present invention also relates to a technical plant, which includes, for example, a work area for producing ready-to-ship products from delivered goods.

BACKGROUND INFORMATION

Certain technical plants for producing ready-to-ship products from delivered goods include a goods entry region and a goods exit region. Goods delivered to the technical plant are stored temporarily in the goods entry region and are then transported into the work area. Produced products are transported out of the work area and stored temporarily in the goods exit region until they are shipped out of the technical plant.

German Patent Document No. 10 2017 002 963 describes a production plant and a method for operating a production plant for manufacturing a product.

A system having a plurality of load carriers and various modes of transportation as well as a method for operating a corresponding system are described in German Patent Document No. 10 2015 014 714. The load carriers receive and transport loads and are able to switch a mode of transportation automatically during a trip from a starting point to a destination.

A transport system for at least one workpiece to be produced and a method for operating a corresponding transport system are described in German Patent Document No. 10 2018 204 073. The transport system has a movable transport device for transporting the at least one workpiece to be produced.

German Patent Document No. 697 33 131 describes an information transfer system for use in a factory.

SUMMARY

Example embodiments of the present invention provide a method for operating a technical plant and a technical plant.

A method for operating a technical plant is described herein. The technical plant includes a work area for producing ready-to-ship products made from delivered goods, and a building, for example, in which the work area is disposed. According to example embodiments of the present invention, the technical plant includes a plurality of load carriers for transporting goods and for transporting products, and the load carriers each include a control, a drive connected to the control, and a communication interface. The load carriers are, for example, autonomously driving vehicles.

According to example embodiments of the present invention, goods are delivered to the technical plant. The goods are delivered, for example, by motor vehicles, e.g., commercial vehicles, to the building of the technical plant. Delivered goods are transported into the work area by the load carriers. For example, load carriers on which the delivered goods are positioned are moved into the building of the technical plant. Products are produced from the goods transported into the work area. Produced products are transported out of the work area by the load carriers. For example, load carriers on which the produced products are positioned are moved out of the building of the technical plant. Products transported out of the work area are shipped out from the technical plant. This shipment is carried out from the building of the technical plant by motor vehicles, for example, commercial vehicles.

When operating a technical plant with the method described herein, it is not necessary to provide defined goods entry regions at which delivered goods are temporarily stored until they are further processed. Likewise, it is not necessary to provide defined goods exit regions at which produced products are temporarily stored until they are shipped. Similarly, a defined material warehouse is not required. Delivered goods and produced products are disposed on load carriers that are freely movable within the technical plant. This, for example, saves surface area in the building of the technical plant, thus, for example, reducing the capital costs for the technical plant.

According to example embodiments, the technical plant is arranged as an assembly plant, and the products are produced by assembling the goods transported into the work area. For example, the goods are gearwheels, shafts, and housings, and the products are mechanical gearboxes.

According to example embodiments, the technical plant is arranged as a production plant, and the products are produced by processing the goods transported into the work area. For example, the goods are semi-finished products, profiles, and/or metal sheet, for example, and the processing includes steps such as welding, boring, and milling.

According to example embodiments, the technical plant is arranged as a distribution center, and the products are produced by picking goods transported into the work area. For example, the goods are gear motors, and the products are ready-to-ship pallets on which the goods have been picked according to an order from a customer.

According to example embodiments, goods delivered to the technical plant are positioned on load carriers immediately after delivery and transported by the load carriers into the work area. For example, the goods are delivered to the building of the technical plant by a motor vehicle and are immediately repositioned from the motor vehicle onto the load carrier available for receiving goods. Load carriers are, for example, only needed inside the technical plant, but not on the motor vehicle.

According to example embodiments, load carriers with goods positioned thereon are delivered to the technical plant and are transported into the work area. For example, the load carriers with goods positioned thereon are delivered to the building of the technical plant by a motor vehicle and the load carriers are removed from the motor vehicle and moved into the work area. For example, it is not necessary to reload the goods from the motor vehicle onto the load carrier, thereby saving working time.

According to example embodiments, goods transported into the work area are removed from the load carriers, and products are produced from the removed goods. The load carrier from which the goods are removed is thereafter, for example, available for further tasks.

According to example embodiments, products produced in the work area are positioned on load carriers and are transported out of the work area by the load carriers. The load carrier on which the products are positioned is, for example, available for other tasks prior to this.

According to example embodiments, products are produced in the work area from the goods on the load carriers. For example, it is not necessary to reload the goods from the load carrier or to reload the products onto the load carrier, thereby saving working time.

According to example embodiments, at least one of the load carriers includes a lifting device having a platform for receiving products and goods, in which the platform can be moved in a vertical direction between a loading position and a working position, a first group of conveyor rollers disposed in the conveying direction upstream of the lifting device, and a second group of conveyor rollers disposed in the conveying direction downstream of the lifting device.

The first group of conveyor rollers and/or the second group of conveyor rollers are, for example, driven by an electric motor.

According to example embodiments, products and/or goods are positioned onto the first group of conveyor rollers. Then the products and/or goods are conveyed by the first group of conveyor rollers in the conveyance direction to the platform of the lifting device in the loading position. Then the platform with the products and/or goods disposed on the platform is moved in the vertical direction from the loading position into the working position.

According to example embodiments, the platform of the lifting device with the products and/or goods disposed on the platform is moved in the vertical direction from the working position into the loading position. Then the products and/or goods are conveyed from the platform disposed in the loading position in the conveyance direction to the second group of conveyor rollers. Then the products and/or goods are removed from the second group of conveyor rollers.

According to example embodiments, products transported out of the work area are removed from the load carriers immediately prior to shipment. For example, the products are shipped out from the building of the technical plant by a motor vehicle and are immediately positioned from the load carrier onto the motor vehicle available for receiving the products. For example, load carriers are required only inside the technical plant, but not on the motor vehicle.

According to example embodiments, products transported out of the work area remain on the load carriers, and the load carriers are shipped with products positioned thereon. For example, the load carriers with the products positioned thereon are loaded onto the motor vehicle, and the load carriers are shipped with the products positioned thereon. For example, the products do not have to be reloaded from the load carriers onto the motor vehicle, thereby saving working time.

Transport of goods into the work area is, for example, reported by the load carriers via their communication interface to a central server. Procedures, such as logging goods into and out of a goods entry region are thus not required. Nor is manual scanning of goods by an operator required, thereby saving working time.

Transport of products out of the work area is, for example, reported by the load carriers via their communication interface to a central server. Procedures, such as logging products into and out of a goods exit region are thus not required. Nor is manual scanning of products by an operator required, thereby saving working time.

According to an example embodiment of the present invention, a technical plant includes a work area for producing ready-to-ship products from delivered goods. The technical plant can be operated with the method described herein. The technical plant includes, for example, a building in which the work area is disposed and has a plurality of load carriers for transporting goods and for transporting products. The load carriers each include a control, a drive connected to the control, and a communication interface. Load carriers are, for example, autonomously driving vehicles.

When operating a technical plant with the method described herein, it is not necessary to provide defined goods entry regions at which delivered goods are temporarily stored until they are further processed. Nor is it necessary to provide defined goods exit regions at which produced products are temporarily stored until they are shipped. Likewise, a defined material warehouse is not required. Delivered goods and produced products are disposed on load carriers that are nearly freely movable inside the technical plant. Thus, surface area in the building of the technical plant is saved, and capital costs for the technical plant are thus reduced.

Further features and aspects of example embodiments of the present invention are explained in greater detail below with reference to the appended schematic Figures.

BRIEF DESCRIPTION OF THE DRAWING

FIG. 1 schematically illustrates a technical plant.

DETAILED DESCRIPTION

FIG. 1 schematically illustrates a technical plant 5 for producing ready-to-ship products made from delivered goods. The technical plant 5 is an industrial application. The technical plant 5 includes a building 7. A work area 8 is disposed in the building 7. The work area 8 is used for producing ready-to-ship products from delivered goods.

For example, the technical plant 5 is arranged as an assembly plant, and the products are produced by assembling the goods transported into the work area 8. For example, the goods are gearwheels, shafts, and housings, and the products are mechanical gearboxes.

For example, the technical plant 5 is arranged as a production plant, and the products are produced by processing the goods transported into the work area 8. For example, the goods are semi-finished products, profiles, and/or metal sheet, and the processing includes steps, such as welding, boring, and milling.

For example, the technical plant 5 is arranged as a distribution center, and the products are produced by picking the goods transported into the work area 8. For example, the goods are gear motors, and the products are ready-to-ship pallets on which the goods have been picked corresponding to an order from a customer.

The work area 8 of the technical plant 5 includes a plurality of work stations 20. At least one work step required for producing a product can be carried out at each of the work stations 20. The work stations 20 are, for example, production modules, assembly modules, lubrication modules, painting modules, final inspection modules, and picking modules.

The technical plant 5 has a plurality of load carriers 10. The load carriers 10 transport goods and transport products in the technical plant 5. The load carriers 10 each include a control, a drive connected to the control, and a communication interface. The load carriers 10 are, for example, autonomously driving vehicles.

The technical plant 5 further includes a central server 15. The central server 15, for example, coordinates and plans production orders in the technical plant 5. The central server 15 communicates with the load carriers 10 via their communication interfaces, e.g., by a wireless network. The central server 15 further communicates with the work stations 20 of the work area 8 by a wired or wireless network.

During operation of the technical plant 5, goods are delivered to the technical plant 5. Delivery is made to the building 7 of the technical plant, for example, by motor vehicles, e.g., commercial vehicles. Delivered goods are transported by the load carriers 10 into the work area 8. For example, the load carriers 10 on which the delivered goods are positioned are moved into the building 7 of the technical plant 5.

It is possible for the load carriers 10 with goods positioned thereon to be delivered to the building 7 of the technical plant 5 by motor vehicles. The load carriers 10 with the goods are moved into the work area 8. In this manner, the goods on the load carriers 10 are transported into the work area 8 and to the work stations 20.

It is also possible for the goods to be delivered to the building 7 of the technical plant 5 by motor vehicles and to be positioned directly onto the load carriers 10 from the motor vehicles immediately following delivery. The goods on the load carriers 10 are transported into the work area 8 and to the work stations 20.

The transport of goods into the work area 8 is reported to the central server 15 by the load carriers 10 via the communication interface thereof. Thus, which goods are delivered and have traveled into the work area 8 is known to the central server 15.

Products are produced in the work area 8 from the goods transported by the load carriers 10 into the work area 8. The products are, for example, produced at the work stations 20.

It is possible for the goods transported into the work area 8 to first be removed from the load carriers 10. Products are produced at the work stations 20 from the goods removed.

It is also possible for the products produced in the work area 8 at the work stations 20 to be repositioned on load carriers 10 and transported by the load carriers 10 out of the work area 8.

It is also possible for products to be produced from the goods in the work area 8 at the work stations 20 on the load carriers 10. That is, the production from the goods takes place on the load carriers 10. For example, it is not necessary to unload the goods from the load carrier 10 and to load the products onto the load carrier 10.

The produced products are moved out of the work area 8 of the technical plant 5 by the load carriers 10 on which the produced products are positioned. The products transported out of the work area 8 are shipped out from the technical plant 5. Shipment from the building 7 of the technical plant 5 is carried out, for example, by motor vehicles.

It is possible for the products transported out of the work area 8 to remain on the load carriers 10. The load carriers 10, together with the products positioned thereon, are thus loaded onto the motor vehicles, and the load carriers 10 with the products positioned thereon are shipped out from the building 7 of the technical plant 5 by motor vehicles.

It is also possible for the products transported out of the work area 8 to be removed from the load carriers 10 immediately prior to shipment and positioned on motor vehicles. The products are thus shipped out from the building 7 of the technical plant 5 by motor vehicles, while the load carriers 10 remain in the technical plant 5.

The transport of products out of the work area 8 is reported to the central server 15 by the load carriers 10 via their communication interface. Thus, which products have traveled out of the work area 8 and are being shipped is known to the central server 15.

LIST OF REFERENCE NUMERALS

5 Technical plant
7 Building
8 Work area
10 Load carrier
15 Server
20 Work station

The invention claimed is:

1. A method for operating a technical plant including a work area adapted to produce ready-to-ship products from delivered goods and a plurality of load carriers adapted to transport goods and products, each load carrier including a control, a drive connected to the control, and a communication interface, comprising:
delivering goods to the technical plant;
transporting the delivered goods into the work area by the load carriers;
producing products in the work area from the goods transported into the work area;
transporting the produced products out of the work area by the load carriers; and
shipping the products transported out of the work area out from the technical plant;
wherein the products are produced from the goods on the load carriers in the work area; and
wherein at least one of the load carriers includes a lifting device having a platform, movable in a vertical direction between a loading position and a working position, adapted to receive the products and the goods, a first group of conveyor rollers arranged in a conveying direction upstream of the lifting device, and a second group of conveyor rollers arranged in the conveying direction downstream of the lifting device.

2. The method according to claim 1, wherein the technical plant is arranged as an assembly plant, and the products are produced by assembling the goods transported into the work area.

3. The method according to claim 1, wherein the technical plant is arranged as a production plant, and the products are produced by processing the goods transported into the work area.

4. The method according to claim 1, wherein the technical plant is arranged as a distribution center, and the products are produced by picking the goods transported into the work area.

5. The method according to claim 1, wherein the goods delivered to the technical plant are positioned on the load carriers immediately after delivery and are transported by the load carriers into the work area.

6. The method according to claim 1, wherein the load carriers with goods positioned thereon are delivered to the technical plant and are transported into the work area.

7. The method according to claim 1, wherein the goods transported into the work area are removed from the load carriers, and the products are produced from the removed goods.

8. The method according to claim 1, wherein the products produced in the work area are positioned on the load carriers and transported out of the work area by the load carriers.

9. The method according to claim 1, wherein the products transported out of the work area are removed from the load carriers immediately prior to shipment.

10. The method according to claim 1, wherein transport of the goods into the work area is reported by the load carriers via the communication interface to a central server.

11. The method according to claim 10, wherein transport of the products of the work area is reported by the load carriers via the communication interface to the central server.

12. The method according to claim 1, wherein transport of the products out of the work area is reported by the load carriers via the communication interface to a central server.

13. A technical plant, comprising:
a work area adapted to produce ready-to-ship products from delivered goods;
wherein the technical plant is adapted to be operated by the method recited in claim 1.

14. A method for operating a technical plant including a work area adapted to produce ready-to-ship products from delivered goods and a plurality of load carriers adapted to transport goods and products, each load carrier including a control, a drive connected to the control, and a communication interface, comprising:
delivering goods to the technical plant;
transporting the delivered goods into the work area by the load carriers;
producing products in the work area from the goods transported into the work area;
transporting the produced products out of the work area by the load carriers; and
shipping the products transported out of the work area out from the technical plant;
wherein at least one of the load carriers includes a lifting device having a platform, movable in a vertical direction between a loading position and a working position, adapted to receive the products and the goods, a first group of conveyor rollers arranged in a conveying direction upstream of the lifting device, and a second group of conveyor rollers arranged in the conveying direction downstream of the lifting device.

15. The method according to claim 14, wherein the first group of conveyor rollers and/or the second group of conveyor rollers are driven by an electric motor.

16. The method according to claim 14, wherein the products and/or the goods are positioned on the first group of conveyor rollers, the products and/or the goods are conveyed by the first group of conveyor rollers in the conveying direction to the platform of the lifting device in the loading position, and the platform with the products and/or the goods disposed on the platform is moved in the vertical direction from the loading position into the working position.

17. The method according to claim 14, wherein the platform of the lifting device with the products and/or the goods disposed on the platform is moved in the vertical direction from the working position into the loading position, the products and/or the goods are conveyed from the platform disposed in the loading position in the conveying direction to the second group of conveyor rollers, and the products and/or the goods are removed from the second group of conveyor rollers.

18. A technical plant, comprising:
a work area adapted to produce ready-to-ship products from delivered goods;
wherein the technical plant is adapted to be operated by the method recited in claim 14.

19. A technical plant, comprising:
a work area adapted to produce ready-to-ship products from delivered goods;
a plurality of load carriers adapted to transport goods and products, each load carrier including:
a control;
a drive connected to the control; and
a communication interface;
wherein at least one of the load carriers includes a lifting device having a platform, movable in a vertical direction between a loading position and a working position, adapted to receive the products and the goods, a first group of conveyor rollers arranged in a conveying direction upstream of the lifting device, and a second group of conveyor rollers arranged in the conveying direction downstream of the lifting device;
wherein the technical plant is adapted to perform a method that includes:
delivering goods to the technical plant;
transporting the delivered goods into the work area by the load carriers;
producing products in the work area from the goods transported into the work area;
transporting the produced products out of the work area by the load carriers; and
shipping the products transported out of the work area out from the technical plant.

20. The technical plant according to claim 19, wherein the products are produced from the goods on the load carriers in the work area.

21. A method, for operating a technical plant including a work area adapted to produce ready-to-ship products from delivered goods and a plurality of load carriers adapted to transport goods and products, each load carrier including a control, a drive connected to the control, and a communication interface, comprising:
delivering goods to the technical plant;
transporting the delivered goods into the work area by the load carriers;
producing products in the work area from the goods transported into the work area;
transporting the produced products out of the work area by the load carriers; and
shipping the products transported out of the work area out from the technical plant;
wherein the products transported out of the work area remain on the load carriers, and the load carriers are shipped with the products positioned thereon.

22. A technical plant, comprising:
a work area adapted to produce ready-to-ship products from delivered goods;
wherein the technical plant is adapted to be operated by the method recited in claim 21.

* * * * *